Figure 8:
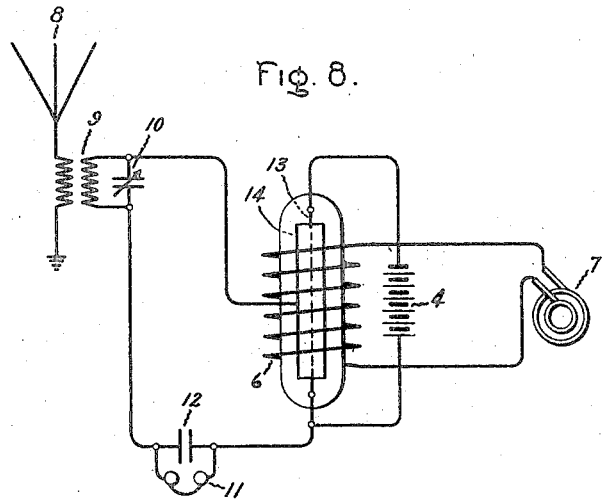

Aug. 18, 1925.
E. F. W. ALEXANDERSON
SIGNALING SYSTEM
Filed Sept. 15, 1919   2 Sheets-Sheet 1
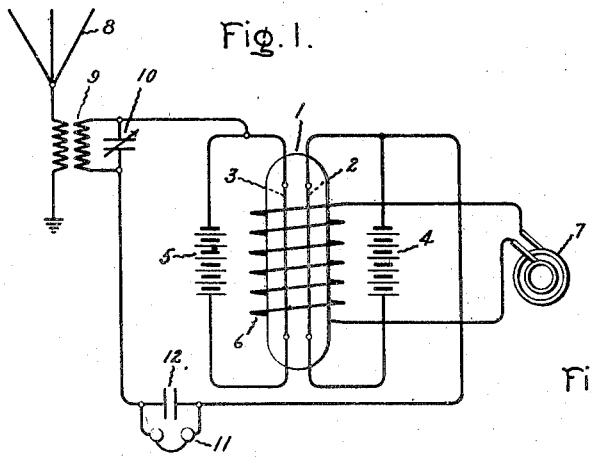
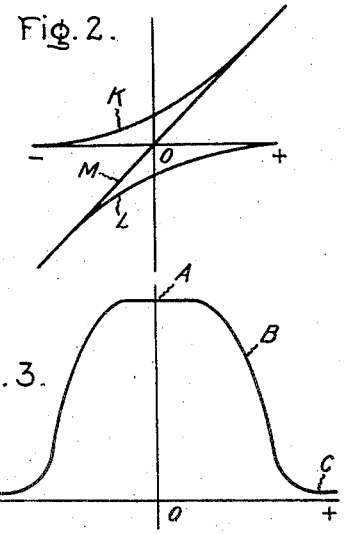
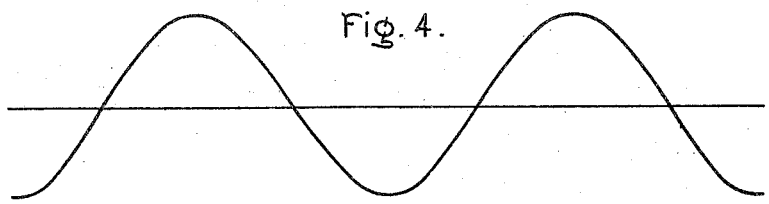
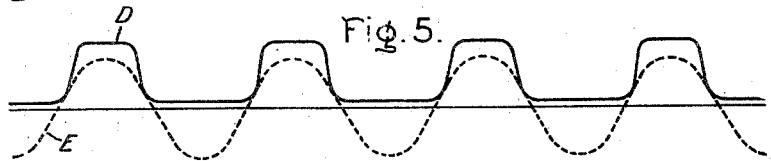
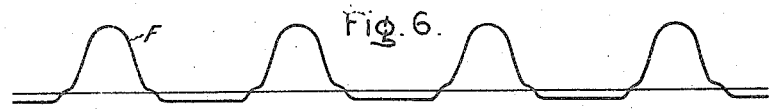
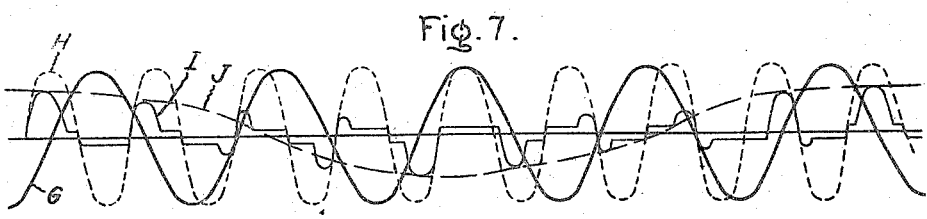
Inventor:
Ernst F.W.Alexanderson,
by
His Attorney.

Patented Aug. 18, 1925.

1,549,737

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SIGNALING SYSTEM.

Application filed September 15, 1919. Serial No. 323,745.

*To all whom it may concern:*

Be it known that I, ERNST F. W. ALEXANDERSON, a citizen of the United States, residing at Schenectady, in the county of Schenectady, State of New York, have invented certain new and useful Improvements in Signaling Systems, of which the following is a specification.

My present invention relates to signaling systems and more particularly to a system for receiving and detecting high frequency signals such, for example, as those which are employed in the wireless transmission of intelligence.

One of the objects of my invention is to provide a simple and efficient means for detecting high frequency signals. A more specific object of my invention is to provide a means for detecting signals produced by means of high frequency continuous currents.

In the specification which follows I have described my invention with particular reference to radio signals. It will be understood, however, that it is not limited in its usefulness to that particular field but that it may equally well be employed for the detection of high frequency signaling currents which are transmitted over wire lines.

All detectors which have been used heretofore, whether of the crystal or vacuum tube type, have fundamentally the same characteristics. They may all be considered as relays which are actuated by the voltage applied from the receiving antenna and results produced by the relays may be measured in terms of current output. The characteristics of the detectors therefore may be represented by a curve showing the relation between voltage input and current output. This curve will in all cases be found to follow substantially the equation $i=e^2$. In other words, the current output of the detector does not follow Ohm's law but instead of being proportional to the signaling voltage impressed on the detector is proportional to the square of the voltage. This characteristic is particularly disadvantageous in radio receiving for receiving weak signals when strays are present which are of greater magnitude than the signals. If, for example, the strays are four times as strong as the signaling waves the response produced in the detector by the strays will be sixteen times as strong as that produced by the signals. A further object of my invention is to provide a detector in which this disadvantage will be overcome and in which the current output will be substantially proportional to the voltage input instead of the square of the voltage input.

All previously used detectors depend for their operation upon some form of asymmetry in their operating characteristics by reason of which a certain degree of rectification is obtained; that is, a voltage impulse of one polarity produces a greater current output or change in the current than a voltage impulse of the opposite polarity. An effect of this nature is necessary in order to produce a current which will actuate one of the devices usually employed for producing an intelligible indication of the signal, such, for example, as the ordinary telephone receiver, the high frequency alternating currents which are employed for transmitting the signal being incapable of actuating the diaphragm of the receiver.

In carrying my invention into effect I provide as a detector a resistance device which may be included in the receiving circuit. The current through this device substantially follows Ohm's law and is therefore directly proportional to the impressed voltage. The necessary asymmetry of the device for securing the required rectifying effect is secured by periodically varying the value of this resistance by means of a suitable modifying force which is controllable at the will of the operator at the receiving station. The value of the resistance is controlled or varied in such a way that it is made comparatively small during desired periods and is made exceedingly large during other periods. This permits the flow of an appreciable current in the receiving circuit during desired portions of the impressed signaling wave and causes the practical suppression of the current in the receiving circuit during other portions of the signaling wave.

My improved detector may be operated in various ways. If the means for varying its resistance is so arranged that the resistance is varied between its maximum and minimum values at a frequency corresponding to the frequency of the signaling current and the relations between the signaling current and the modifying force are so fixed that the periods of maximum conductivity correspond with the periods of voltage impulses of one polarity all current impulses of one polarity will be allowed to flow through the device and all current impulses of the opposite polarity will be substantially suppressed. In this way a practically complete rectification may be obtained and the resulting current will be a pulsating direct current. In the case of telegraphic signals the pulsations of this current will all be of high frequency and no audible indication will be produced by the current in a telephone receiver. Such a current, however, may be employed to produce an indication in a photographic recorder or other indicating device which is operable by a steady direct current.

Because of the difficulty of keeping the modifying force operating in synchronism with the signaling wave as well as the fact that the current produced in this way does not give an audible indication in a telephone receiver it will usually be found desirable to supply the modifying force in such a way that the resistance is caused to vary between its maximum and minimum values at a frequency slightly different from that of the signaling wave. The current which will flow in the detector circuit will then be in effect a pulsating or alternating current of a frequency corresponding to the difference of frequency between the signaling current and the frequency of the changes in resistance. If this difference in frequency is such as to come within the range of audible frequencies the resulting current will be capable of producing an indication in the ordinary telephone receiver.

The resistance device used in carrying my invention into effect may assume a variety of forms. In the preferred form of my invention it consists of an evacuated receptacle containing an electron emitting cathode and an anode the current through the device being carried by a stream of negative electrons flowing across the evacuated space from cathode to anode. This stream of negative electrons is controlled by means of a magnetic field produced by a coil which surrounds the evacuated receptacle. If this field is made strong enough substantially all of the electrons emitted from the cathode will be prevented from reaching the anode and the resistance of the device to the flow of current will be exceedingly large. Where no magnetic field is present or where the magnetic field is weak the resistance of the device will be small in comparison to its resistance with a strong magnetic field, and appreciable currents will be allowed to flow.

The magnetic field for controlling the stream of electrons and the resistance of the device may be produced by an alternating current of suitable value. When this current is passing through its zero values the resistance of the device will be a minimum and when it reaches its maximum positive and negative values the resistance of the device will be a maximum. Hence there will be two points of maximum value and two points of minimum value of the resistance for every complete cycle of the alternating current. In order to produce a complete rectification of the signaling current therefore the alternating current which produces the magnetic field should have a frequency equal to half the frequency of the signaling current. When it is desired to produce an audible pulsating or alternating current in the detector circuit the alternating current which produces the magnetic field should differ in frequency from half the frequency of the signaling current by an amount equal to half the frequency of the audible current desired.

Figure 9:
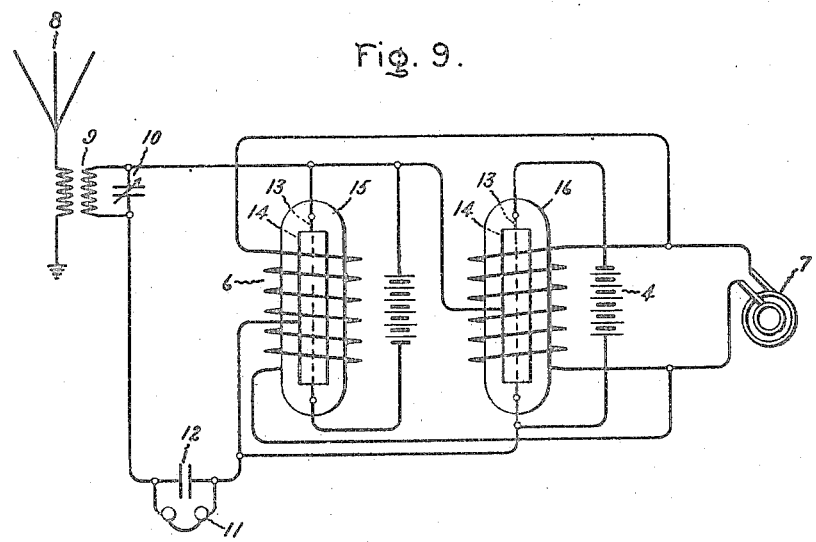

The novel features which I believe to be characteristic of my invention are set forth with particularity in the appended claims. My invention itself, however, both as to its organization and method of operation together with further objects and advantages thereof will best be understood by reference to the following description taken in connection with the accompanying drawing in which Fig. 1 illustrates diagrammatically a circuit connection which may be used in carrying my invention into effect; Fig. 2, shows the relation between the characteristic curves of other forms of detector and that of my improved devices; Figs. 3 to 7 are diagrams illustrating the operation of my system, and Figs. 8 and 9 are modified circuit connections which may be used.

In Fig. 1, I have indicated as one form in which my detector may be embodied an evacuated receptacle 1 containing two filamentary electrodes 2 and 3 which are supplied with heating current by means of the batteries 4 and 5. A magnetic field, in a direction parallel to that of the electrodes 2 and 3, for controlling the flow of current between these electrodes may be produced by means of the coil 6 surrounding the receptacle; this coil being supplied with magnetizing current by a local source 7. Received high frequency signaling waves which it is desired to detect may be impressed from the antenna 8 upon the usual resonant receiving circuit which comprises the coupling inductance 9 and condenser 10 and which is connected to the electrodes 2 and 3 of the detector. The receiving circuit also includes an indicating instrument which, in case an audible frequency current is to be produced, may be the usual telephone receiver 11 shunted by a condenser 12. In case a constant direct current is to be produced or a current which is incapable of actuating a telephone receiver a photographic recorder or other instrument which will be actuated by such currents may be substituted for the telephone receiver.

When there is no magnetic field set up in the coil 6, the detector may be considered as a constant resistance in the receiving circuit through which current may flow in either direction by reason of the fact that both electrodes are heated. The electrons will then tend to move in straight lines between the electrodes and the resistance will be a minimum. If, however, a magnetic field is set up in coil 6 the electrons will be caused to move in spiral lines around the electrodes, the distance between turns of the spiral decreasing as the magnetic field is increased. As the field is increased the number of electrons passing between the electrodes will decrease and hence the resistance of the device will increase. If the field is made strong enough practically all of the electrons will be prevented from flowing between the electrodes, and the resistance of the device will become a maximum, this maximum value being many times greater than the minimum value. In Fig. 3, I have indicated the variation in conductivity of the device with varying magnetic field, conductivity being plotted as ordinates and strength of magnetic field as abscissae. When there is no magnetic field, the conductivity of the device is represented by point "A". When the magnetic field in one direction increases the conductivity decreases as represented by the portion "B" of the curve until a point "C" is reached at which the conductivity becomes a minimum. Further increase in the strength of the magnetic field beyond this point will produce substantially no change in conductivity. In so far as its effect on the conductivity of the device is concerned the direction of the magnetic field is immaterial. The curve of Fig. 3, shows the variations in conductivity of the device with changes in the magnetic field from a maximum in one direction, marked negative for convenience, to zero and to a maximum in the opposite direction.

The curve of Fig. 4 represents the variations in the force which modifies the resistance of the detector. In the case illustrated the modifying force is produced by a current of half the frequency of the signaling waves and the curve of Fig. 4, may be considered as representing changes in the magnetic field.

The curve "D" of Fig. 5, represents the changes in conductivity of the detector produced by the modifying force illustrated in Fig. 4. At points where the modifying force is zero, the conductivity is maximum, and at points where the modifying force exceeds a critical value the conductivity is a minimum, thus for every cycle of the local source of current there will be two points of maximum conductivity and two points of minimum conductivity.

If the curve "E" of Fig. 5 represents the signaling potential impressed upon the detector the current through the detector will be represented by the curve "F" of Fig. 6. The periods of positive signaling impulses correspond to the periods of maximum conductivity and the periods of negative signaling impulses correspond to periods of minimum conductivity. Hence the current through the detector will be substantially all in one direction and will in effect be a direct current having high frequency pulsations. These pulsations will be smoothed out by the condenser 12 and the effect of the current upon the indicating instrument will be substantially the same as that of a steady direct current. This current, of course, will not produce an audible tone in a telephone receiver but may be used to actuate a photographic recorder or any other form of indicating device which is responsive to a steady direct current.

It is, of course, difficult to maintain a local source of current at a frequency equal to just half the frequency of the received signaling currents and to keep the phase relation between the local current and the signaling current just right to produce the effect above described. For this reason and because of the advantages of audible reception it will be preferable to operate the local source of current at a frequency somewhat different from half the frequency of the signaling current. The curves of Fig. 7 illustrate the effects of this method of operation. In this case the modifying force as represented by the curve G has a frequency slightly greater than half the frequency of the signaling potential, which is represented by the curve H. The resultant current through the detector is represented by the curve I. This current has high frequency pulsations like that of curve F of Fig. 6 but is made up of impulses of both polarities. When the high frequency impulses are smoothed out the effective current will be substantially as represented by the curve J; that is, the resultant current will be a low frequency alternating current which, if the frequency of the local source is properly adjusted, will produce an audible note in the telephone receiver 11. The frequency of this current will be equal to twice the amount by which the local source differs from half the frequency of the signaling waves.

The curve K of Fig. 2 represents the current characteristic of the usual detector, the ordinates representing current and the abscissae applied voltages. This characteristic in all previous detectors is a curve and not a straight line, that is, the current instead of varying directly as the voltage varies as some power of the impressed voltage. In vacuum valve or electron discharge detectors having rectifying properties the current does not become zero, when the applied voltage becomes zero but by reason of the initial velocity of the electrons current will flow when no voltage is impressed upon the electrodes and a negative potential upon the anodes is required to completely stop the current flow, the negative potential required being ordinarily large in comparison with the signaling potentials applied by the reception of weak signals. Such devices therefore are very inefficient rectifiers, the rectifying effect being due entirely to the fact that a positive potential on the anode produces a greater current than a negative potential. By reason also of the fact that the current is not directly proportional to the voltage, as has been pointed out previously, the ratio between strays and signaling currents is increased by the detector.

If the current K of Fig. 2 represents the current of negative electrons which tends to flow from electrode 2 to electrode 3 the curve L will represent the current of negative electrons which tends to flow from electrode 3 to electrode 2, the combination of these two curves and the resultant current through the device may be represented by the straight line M. Thus it will be seen that the effect of the initial velocity of the electrons is eliminated and the current becomes zero when the impressed voltage is zero. The current also is directly proportional to the impressed voltage and the disadvantage of previous detectors with respect to strays is overcome. It is of course apparent from an inspection of the characteristic M that the device of itself has no asymmetric property and hence no rectifying effect will occur without the influence of the magnetic field. This is immaterial however since by means of the magnetic field the resistance of the device may be varied to such an extent as to practically suppress the current during any desired portion of the signaling wave and thus produce substantially perfect rectification. The effect in the indicating device therefore will be due to current changes produced by impulses of one polarity only rather than the difference in current changes produced by two impulses of opposite polarity as in previous detectors.

In its broader aspect my improved detector may be considered as an ordinary resistance having the usual resistance characteristic that the current flowing therethrough is directly proportional to the impressed voltage. The rectifying or detecting effect is produced, not by means of any inherent asymmetry in the current characteristics of the device but purely by variations in the value of the resistance without altering its pure resistance characteristic.

The receiving system which I have described differs in several important particulars from the well-known heterodyne receiving system which has heretofore been used extensively for the reception of continuous wave signals. The heterodyne receiving system as customarily used involves the use of local oscillations which are radiated through the receiving antenna and thus produce interference with other signals which it may be desired to receive in the neighborhood of the receiving station. In my system, the local source of oscillations is entirely independent of the radiating system and therefore under no circumstances will it produce such interference. The heterodyne receiving system involves the use of a rectifying detector which rectifies all impulses impressed upon the system along with the signals which it is desired to receive. It is therefore subject to interference from any radio telephone messages which may be impressed upon the receiving system as well as from any spark signals which may be impressed thereon. On the other hand, my receiving system does not produce an audible indication except in response to waves of a frequency differing from that of the signals to be received by an amount in the audible range. The heterodyne receiving system also involves a combination of the locally produced current and the received impulses whereby a beat effect is produced. In my system, there is no combination of the local current with the received impulses and no beat effect is produced. The only energy which serves to actuate the receiver is the energy of the received impulses, whereas in the heterodyne system the receiver is actuated by the combined energy of the received impulses and the energy of the locally produced current.

The principal advantages of my invention may be also obtained by means of a modified form of detector as indicated in the diagram of Fig. 8. In this case the detector comprises a linear filamentary cathode 13 surrounded by a cylindrical anode 14. In the absence of any magnetic field the detector in this case would have a characteristic similar to the curve K of Fig. 2. Since however by the aid of the magnetic field the current may be reduced to substantially zero when the signaling voltage falls to zero the real characteristic of the device will approximate the straight line M of Fig. 2 and the current will be directly proportional to the voltage. If the receptacle is so highly evacuated that no gas effects are present current will of course flow in only one direction through the device. It is immaterial however in so far as the operation of the telephone receiver is concerned whether the resultant current through the detector is an alternating current as indicated by curve J of Fig. 7 or a pulsating unidirectional current.

In Fig. 9 I have indicated an arrangement whereby exactly the same effect may be secured as by the arrangement of Fig. 1. In this case the detector of Fig. 1 is replaced by the devices 15 and 16 like the device of Fig. 8 and so connected to the receiving circuit that current may flow in either direction through the receiving circuit. The local source 7 supplies magnetizing current for the fields of both devices.

I am aware that it has been proposed to obtain results similar in nature to those which I have described by means of a rotating commutating device known in the art as the "tone wheel". This device however involves the difficulties inherent in all devices having moving parts and which depend for their operation upon the making and breaking of contacts. In contradistinction to these devices my improved detector does not require any moving parts for its operation and produces the desired result without any making or breaking of contacts in the receiving circuit and for these reasons is much simpler and more efficient in its operation.

While I have described the preferred form of variable resistance device my invention is by no means limited to this particular form as it is apparent that other forms of variable resistance may be used in carrying my invention into effect. I have also indicated the receiving circuit as being directly associated with the receiving antenna. It is obvious that this is not at all essential to my invention but that any desired degree of amplification may be made before the signaling waves are impressed upon the detector and furthermore that, if desired, the current in the detector may be amplified before it is impressed upon the indicating device.

What I claim as new and desire to secure by Letters Patent of the United States, is,—

1. A detector for high frequency signaling currents comprising a pair of electron discharge devices oppositely connected in a circuit upon which received signaling currents may be impressed, and means for producing a magnetic field for periodically varying the current flow through said devices.

2. A detector for high frequency signaling currents comprising a pair of electron discharge devices oppositely connected in a circuit upon which received signaling currents may be impressed, and means for producing a magnetic field for periodically varying the current flow through said devices at a frequency slightly different from the frequency of the signaling currents to be detected.

3. A detector for high frequency signaling currents comprising a pair of electron discharge devices oppositely connected in a circuit upon which received signaling currents may be impressed, and means for producing a magnetic field for periodically varying the resistances of said devices independently of the current flow therethrough.

4. Means for detecting high frequency signals comprising a circuit upon which signaling currents received from a distant station may be impressed, a resistance in said circuit comprising an electron discharge device having an electron emitting cathode and an anode, and means controlled independently of current flowing between said cathode and anode for periodically varying the value of said resistance.

5. Means for detecting high frequency signals comprising a circuit upon which signaling currents received from a distant station may be impressed, a resistance in said circuit comprising an electron discharge device having an electron emitting cathode and an anode, and a local source of current for periodically varying the value of said resistance independently of the current flowing between said cathode and anode.

6. Means for detecting high frequency signals comprising a circuit upon which signaling currents may be impressed, a resistance in said circuit comprising an electron discharge device having an electron emitting cathode and an anode, indicating means in said circuit, and a local source of current for periodically varying the value of said resistance independently of the current in said circuit.

7. Means for detecting high frequency signals comprising a circuit upon which signaling currents may be impressed, a resistance in said circuit comprising an electron discharge device having an electron emitting cathode and an anode, means for producing a magnetic field for periodically varying the value of said resistance, and means associated with said circuit for producing an indication of the signals impressed upon the circuit.

8. Means for detecting high frequency signals comprising a circuit upon which signaling currents may be impressed, a resistance in said circuit comprising an electron discharge device having an electron emitting cathode and an anode, a local source of current for producing a magnetic field for periodically varying the value of said resistance, and means associated with said circuit for producing an indication of the signals impressed upon the circuit.

9. Means for detecting high frequency signals comprising a circuit upon which signaling currents may be impressed, a resistance in said circuit comprising an electron discharge device having an electron emitting cathode and an anode, indicating means in said circuit, and a local source of current for producing a magnetic field for periodically varying the value of said resistance.

10. Means for detecting high frequency signals comprising a circuit upon which signaling currents may be impressed, a resistance device in said circuit through which the current is carried by a stream of negative electrons, means independent of the current in said circuit for controlling the electron stream and thereby periodically varying the conductivity of said resistance device, and means associated with said circuit for producing an indication of the signals impressed upon the circuit.

11. Means for detecting high frequency signals comprising a circuit upon which signaling currents may be impressed, a resistance device in said circuit through which the current is carried by a stream of negative electrons, means independent of the current in said circuit for producing a magnetic field for controlling the electron stream and thereby varying the conductivity of said resistance device, and means associated with said circuit for producing an indication of the signals impressed upon the circuit.

12. Means for detecting high frequency signals comprising a circuit upon which signaling currents may be impressed, a resistance device in said circuit through which the current is carried by a stream of negative electrons, a local source of high frequency current for producing a magnetic field for controlling the electron stream and thereby varying the conductivity of said resistance device, and means associated with said device for producing an indication of received signals.

13. Means for detecting high frequency signals comprising a circuit upon which signaling currents may be impressed, a resistance in said circuit, and a source of high frequency current of a frequency slightly different from half the frequency of the signaling currents for periodically varying the value of said resistance.

14. Means for detecting high frequency signals comprising a circuit upon which signaling currents may be impressed, a resistance in said circuit comprising an electron discharge device having an electron emitting cathode and an anode, and a source of high frequency current of a frequency slightly different from half the frequency of the signaling currents for periodically varying the value of said resistance.

15. Means for detecting high frequency signals comprising a circuit upon which signaling currents may be impressed, a resistance in said circuit, and a source of high frequency current of a frequency slightly different from half the frequency of the signaling current for producing a magnetic field for periodically varying the value of said resistance.

16. Means for detecting high frequency signals comprising a circuit upon which signaling currents may be impressed, a resistance in said circuit comprising an electron discharge device having an electron emitting cathode and an anode, and a source of high frequency current of a frequency slightly different from half the frequency of the signaling currents for producing a magnetic field for periodically varying the value of said resistance.

17. Means for detecting high frequency signals comprising a circuit upon which signaling currents may be impressed, a resistance device in said circuit through which the current is carried by a stream of negative electrons, and a local source of high frequency current of a frequency slightly different from half the frequency of the signaling currents for controlling the electron stream and thereby periodically varying the conductivity of said resistance device.

18. Means for detecting high frequency signals comprising a circuit upon which signaling currents may be impressed, a resistance device in said circuit through which the current is carried by a stream of negative electrons, and a local source of high frequency current of a frequency slightly different from half the frequency of the signaling currents for producing a magnetic field for controlling the electron stream and thereby periodically varying the conductivity of said resistance device.

19. Means for detecting high frequency signals comprising a circuit upon which signaling currents may be impressed, a resistance in said circuit, and means for producing a magnetic field for varying the value of said resistance which periodically varies between maximum and minimum values at a frequency slightly different from the frequency of the signaling current.

20. Means for detecting high frequency signals comprising a circuit upon which signaling currents may be impressed, a resistance in said circuit, and a local source of high frequency current for producing a magnetic field for varying the value of said resistance which periodically varies between maximum and minimum values at a frequency slightly different from the frequency of the signaling current.

21. Means for detecting high frequency signals comprising a circuit upon which signaling currents may be impressed, a resistance in said circuit comprising an electron discharge device having an electron emitting cathode and an anode, and means for producing a magnetic field for varying the value of said resistance which periodically varies between maximum and minimum values at a frequency slightly different from the frequency of the signaling current.

22. Means for detecting high frequency signals comprising a circuit upon which signaling currents may be impressed, a resistance in said circuit comprising an electron discharge device having an electron emitting cathode and an anode, and a local source of high frequency current for producing a magnetic field for varying the value of said resistance which periodically varies between maximum and minimum values at a frequency slightly different from the frequencey of the signaling current.

23. Means for detecting high frequency signals comprising a circuit upon which signaling currents may be impressed, a resistance in said circuit through which the current is carried by a stream of negative electrons, and means for producing a magnetic field for controlling the electron stream which periodically varies between maximum and minimum values at a frequency slightly different from the frequency of the signaling current.

24. Means for detecting high frequency signals comprising a circuit upon which signaling currents may be impressed, a resistance in said circuit through which the current is carried by a stream of negative electrons, and a local source of high frequency current for producing a magnetic field for controlling the electron stream which periodically varies between maximum and minimum values at a frequency slightly different from the frequency of the signaling current.

25. Means for detecting high frequency signals comprising a circuit upon which signaling currents may be impressed, a pair of resistances connected in said circuit through each of which current is carried by a stream of negative electrons, said resistances being connected to carry current in opposite directions, and means for producing magnetic fields for controlling the electron streams which vary periodically between maximum and minimum values.

26. Means for detecting high frequency signals comprising a circuit upon which signaling currents may be impressed, a pair of resistances connected in said circuit through each of which current is carried by a stream of negative electrons, said resistances being connected to carry current in opposite directions, and means for producing magnetic fields controlling the electron streams which vary periodically between maximum and minimum values at a frequency slightly different from the frequency of the signaling current.

27. Means for detecting high frequency signals comprising a circuit upon which signaling currents may be impressed, a pair of resistances connected in said circuit through each of which current is carried by a stream of negative electrons, said resistances being connected to carry current in opposite directions and a local source of high frequency current for producing magnetic fields for controlling the electron streams which vary periodically between maximum and minimum values.

28. A detector for high frequency signaling currents comprising a resistance device, and means for producing a magnetic field for periodically varying the conductivity of said device between fixed maximum and minimum values at a frequency slightly different from the frequency of the signaling currents to be detected.

29. A detector for high frequency signaling currents comprising a resistance device through which the current is carried by a stream of negative electrons, and means for producing a magnetic field for controlling the electron stream and thereby varying the conductivity of said device between fixed maximum and minimum values at a frequency slightly different from the frequency of the signaling currents to be detected.

30. A detector for high frequency signaling currents comprising a resistance device having an electron emitting cathode and an anode, and means for producing a magnetic field for periodically varying the conductivity of said device between fixed maximum and minimum values at a frequency slightly different from the frequency of the signaling currents to be detected.

31. A detector for high frequency signaling currents comprising a pair of resistance devices oppositely connected in an electric circuit, and a source of current associated therewith for periodically varying the conductivity of said devices between fixed maximum and minimum values at a frequency slightly different from the frequency of the signaling currents to be detected.

32. A detector for high frequency signaling currents comprising a pair of resistance devices oppositely connected in an electric circuit and through which the current is carried by a stream of electrons, and a source of current associated therewith for controlling the electron streams and thereby periodically varying the conductivity of said devices between fixed maximum and minimum values at a frequency slightly different from the frequency of the signaling currents to be detected.

33. A detector for high frequency signaling currents comprising a linear filamentary cathode adapted to be heated to incandescence to emit electrons and a cooperating anode enclosed in an evacuated receptacle, means for producing by the signaling currents to be detected a flow of electrons from said cathode to said anode, and means for producing a variable magnetic field in a direction parallel to said cathode and thereby varying the number of electrons which will reach said anode from said cathode.

34. A detector for high frequency signaling currents comprising a linear filamentary cathode adapted to be heated to incandescence to emit electrons and an electrode surrounding said cathode and coaxial therewith enclosed in an evacuated receptacle, means for producing by the signaling currents to be detected a flow of electrons from said cathode to said anode, and means for producing a variable magnetic field in a direction parallel to said cathode and thereby varying the number of electrons which will reach said anode from said cathode.

35. A detector for high frequency signaling currents comprising a linear filamentary cathode adapted to be heated to incandescence to emit electrons and a cooperating anode enclosed in an evacuated receptacle, means for producing by the signaling currents to be detected a flow of electrons from said cathode to said anode, and means for producing a variable magnetic field in a direction parallel to said cathode and thereby varying the current flow between cathode and anode.

36. A detector for high frequency signaling currents comprising a linear filamentary cathode adapted to be heated to incandescence to emit electrons and a cooperating anode enclosed in an evacuated receptacle, means for producing by the signaling currents to be detected a flow of electrons from said cathode to said anode, and a local source of alternating current of materially lower frequency than the frequency of the signaling currents to be detected and for producing a variable magnetic field in a direction parallel to said cathode thereby varying the number of electrons which will reach said anode from said cathode.

37. A detector for high frequency signaling currents comprising a linear filamentary cathode adapted to be heated to incandescence to emit electrons and a cooperating anode enclosed in an evacuated receptacle, means for producing by the signaling currents to be detected a flow of electrons from said cathode to said anode, a local source of current of a frequency slightly different from half the frequency of the signaling currents to be detected for producing a magnetic field in a direction parallel to said cathode and thereby varying the number of electrons which will reach said anode from said cathode.

38. A detector for high frequency signaling currents comprising an electron discharge apparatus having the characteristic that the current flowing therethrough is directly proportional to the impressed voltage, and means for periodically varying the value of the resistance of said apparatus.

39. A detector for high frequency signaling currents comprising an electron discharge apparatus having the characteristic that the current flowing therethrough is directly proportional to the impressed voltage, and means for periodically varying the value of the resistance of said apparatus between fixed maximum and minimum values.

40. A detector for high frequency signaling currents comprising an electron discharge apparatus having the characteristic that the current flowing therethrough is directly proportional to the impressed voltage, and means for producing a varying magnetic field for periodically varying the value of the resistance of said apparatus.

41. A detector for high frequency signaling currents comprising an electron discharge apparatus having the characteristic that the current flowing therethrough is directly proportional to the impressed voltage, and a local source of alternating current for producing a varying magnetic field for periodically varying the value of the resistance of said apparatus.

42. A detector for high frequency signaling currents comprising a resistance device having the characteristic that the current flowing therethrough is directly proportional to the impressed voltage, and a local source of current of a frequency slightly different from half the frequency of the signaling currents to be detected for periodically varying the value of said resistance.

43. A detector for high frequency signaling currents comprising a resistance device having the characteristic that the current flowing therethrough is directly proportional to the impressed voltage, and a local source of current of a frequency slightly different from half the frequency of the signaling currents to be detected for periodically varying the value of said resistance between fixed maximum and minimum values.

44. A detector for high frequency signaling currents comprising an evacuated envelope containing a linear filamentary cathode adapted to be heated to incandescence to emit electrons and an anode extending in a direction parallel to that of the cathode, and means for producing a variable magnetic field in a direction parallel to that of the cathode and thereby varying the flow of current from said cathode to said anode.

45. A detector for high frequency signaling currents comprising an evacuated envelope containing a linear filamentary cathode adapted to be heated to incandescence to emit electrons and an anode extending in a direction parallel to that of the cathode, means for producing by the signaling impulses to be detected a flow of current from said cathode to said anode, and means for producing a variable magnetic field in a direction parallel to that of the cathode and thereby varying the flow of current from said cathode to said anode.

46. A detector for high frequency signaling currents comprising a tubular evacuated receptacle containing a filamentary cathode adapted to be heated to incandescence and a cooperating anode, both of which extend in a direction parallel to the axis of said receptacle, means for producing by the signaling impulses to be detected a flow of current from said cathode to said anode, and means for producing a variable magnetic field in a direction parallel to the axis of said receptacle and thereby varying the flow of current from said cathode to said anode.

47. A detector for high frequency signaling currents comprising a tubular evacuated receptacle containing a filamentary cathode adapted to be heated to incandescence, and a cooperating anode, both of which extend in a direction parallel to the axis of said receptacle, means for producing by the signaling impulses to be detected a flow of current from said cathode to said anode, and means for producing a variable magnetic field in a direction parallel to the axis of said receptacle and thereby varying the flow of current from said cathode to said anode.

48. A detector for high frequency signaling currents comprising a tubular evacuated receptacle containing a filamentary cathode adapted to be heated to incandescence and a cooperating anode, both of which extend in a direction parallel to the axis of said receptacle, means for producing by the signaling impulses to be detected a flow of current from said cathode to said anode, a coil surrounding said receptacle, and means for supplying a variable current to said coil.

49. A detector for high frequency signaling currents comprising a tubular evacuated receptacle containing a filamentary cathode adapted to be heated to incandescence and a cooperating anode, both of which extend in a direction parallel to the axis of said receptacle, means for producing by the signaling impulses to be detected a flow of current from said cathode to said anode, a coil surrounding said receptacle, and means supplying to said coil an alternating current of a frequency slightly different from half the frequency of the signaling currents to be detected.

50. A detector for high frequency signaling currents comprising a tubular evacuated receptacle containing an electron emitting cathode and an anode, a coil surrounding cathode and an anode, a coil surrounding said receptacle, and means for supplying to said coil an alternating current of a frequency slightly different from half the frequency of the signaling currents to be detected.

51. A detector for high frequency signaling currents comprising a tubular evacuated receptacle containing an electron emitting cathode and an anode, and means for producing a magnetic field in a direction parallel to the axis of said receptacle, which varies between maximum and minimum values at a frequency slightly different from the frequency of the signaling currents to be detected and whose maximum value is great enough to interrupt the current between cathode and anode.

52. A detector for high frequency signaling currents comprising a tubular evacuated receptacle containing an electron emitting cathode and an anode, means for producing by the signaling impulses to be detected a flow of current from said cathode to said anode, and means for producing a periodically varying magnetic field in a direction parallel to the axis of said receptacle and thereby varying the flow of current from said cathode to said anode.

53. A detector for high frequency signaling currents comprising a tubular evacuated receptacle containing an electron emitting cathode and an anode, means for producing by the signaling impulses to be detected a flow of current from said cathode to said anode, a coil surrounding said receptacle, and means for supplying a variable current to said coil.

54. A detector for high frequency signaling currents comprising a tubular evacuated receptacle containing an electron emitting cathode and an anode, means for producing by the signaling impulses to be detected a flow of current from said cathode to said anode, a coil surrounding said receptacle, and means for supplying to said coil an alternating current of a frequency slightly different from half the frequency of the signaling currents to be detected.

55. A detector for high frequency signaling currents comprising a tubular evacuated receptacle containing an electron emitting cathode and an anode, means for producing by the signaling impulses to be detected a flow of current from said cathode to said anode, and means for producing a magnetic field in a direction parallel to the axis of said receptacle which varies between maximum and minimum values at a frequency slightly different from the frequency of the signaling currents to be detected.

56. A detector for high frequency signaling currents comprising a pair of tubular evacuated receptacles each containing an electron emitting cathode and an anode, means for producing by means of signaling impulses an alternate flow of current through the two devices and means for producing simultaneously magnetic fields in directions parallel to the axes of the two receptacles which vary between maximum and minimum values at a frequency slightly different from the frequency of the signaling currents to be detected.

57. A detector for high frequency signaling currents comprising a pair of tubular evacuated receptacles each containing an electron emitting cathode and an anode, means for producing by means of signaling impulses an alternate flow of current through the two devices, a coil surrounding each of said receptacles, and means for supplying current to said coils, for producing simultaneously magnetic fields in directions parallel to the axes of the two receptacles which vary between maximum and minimum values at a frequency slightly different from the frequency of the signaling currents to be detected.

58. A detector for high frequency signaling currents comprising a pair of tubular evacuated receptacles each containing an electron emitting cathode, and an anode, means for producing by signaling impulses to be detected an alternate flow of current through the two devices, coils surrounding both receptacles and means for simultaneously supplying a variable current to both coils.

59. A detector for high frequency signaling currents comprising a pair of tubular evacuated receptacles each containing an electron emitting cathode and an anode, means for producing by signaling impulses to be detected an alternate flow of current through the two devices, coils surrounding both receptacles and means for simultaneously supplying to both coils an alternating current of a frequency slightly different from half of the frequency of the signaling currents to be detected.

60. The method of detecting high frequency signaling currents which comprises impressing the currents to be detected upon a circuit containing a resistance and causing a locally produced current having a frequency slightly different from half the frequency of the signaling currents to periodically vary the value of the resistance.

61. The method of detecting a high frequency signaling current, which comprises impressing the current to be detected upon a circuit containing a resistance, producing a variable magnetic field and subjecting said resistance to the action of said magnetic field in such a way as to vary the value of the resistance in accordance with variations in the magnetic field.

62. The method of detecting a high frequency signaling current, which comprises impressing the current to be detected upon a circuit containing a resistance, utilizing a local source of high frequency current to produce a variable magnetic field and subjecting said resistance to the action of said magnetic field in such a way as to vary the value of the resistance in accordance with variations in the magnetic field.

63. The method of detecting a high frequency signaling current, which comprises impressing the current to be detected upon a circuit containing a resistance, utilizing a local source of high frequency current to produce a magnetic field which varies between maximum and minimum values at a frequency slightly different from the frequency of the signaling current, and subjecting said resistance to the action of said magnetic field in such a way as to vary the value of the resistance in accordance with variations in the magnetic field.

64. The method of receiving and translating into a signal radio frequency signal-representing energy, which comprises receiving the signal-representing energy, and rectifying the current thereof in a circuit whose impedance is always finite, independently generating an electromotive force varying in amplitude at predetermined frequency, producing variations of impedance of said circuit by said electromotive force, and translating into a signal the rectified current as modified by said impedance variation.

65. Receiving apparatus for translating radio frequency current comprising a circuit, a thermionic device comprising an anode and cathode in said circuit, said circuit being normally without current, means for impressing the received current upon said anode-cathode circuit, a translating instrument subjected to the modified received current in said circuit, and means for independently varying the impedance of said circuit for varying the amplitude of said current.

66. Receiving apparatus for translating radio frequency current comprising a circuit, a thermionic device comprising an anode, cathode and field-producing means for varying the discharge between said anode and cathode, said anode and cathode being disposed in said circuit and said field-producing means being external to said circuit, means for independently varying said field for varying the amplitude of the modified current in said circuit, and a translating instrument subjected to said modified current of varying amplitude.

67. The method of receiving and translating into a signal radio frequency signal representing energy, which comprises receiving the signal representing energy, rectifying the current thereof in a circuit whose impedance is always finite, independently generating an electromotive force varying in amplitude at a predetermined frequency, utilizing the electromotive force thus generated to produce a field which is entirely independent of any field produced by signal representing energy, producing by means of this field variations in the impedance of said circuit and translating into a signal the rectified current as modified by said impedance variation.

68. Receiving apparatus for translating radio frequency current comprising a circuit, means for impressing signal representing radio frequency currents upon said circuit, a thermionic device comprising an anode and a cathode included in said circuit, field producing means which are external to said circuit, means for varying said field exclusively by a local source of currents, and independently of any signal representing currents, and thereby varying the amplitude of the current in said circuit, and a translating instrument subjected to said current of varying amplitude.

In witness whereof, I have hereunto set my hand this 12th day of September, 1919.

ERNST F. W. ALEXANDERSON.